United States Patent Office 3,706,815
Patented Dec. 19, 1972

3,706,815
CHELATED METAL-POLYPHOSPHORIC ACID CATALYSTS, METHOD OF PREPARATION AND ISOMERIZATION PROCESS UTILIZING THE SAME
Starling K. Alley, Jr., Brea, Calif., assignor to Union Oil Company of California, Los Angeles, Calif.
No Drawing. Continuation-in-part of abandoned application Ser. No. 877,435, Nov. 17, 1969. This application May 24, 1971, Ser. No. 146,533
Int. Cl. B01j *11/82*; C07c *5/24*
U.S. Cl. 260—683.65                                    12 Claims

ABSTRACT OF THE DISCLOSURE

Novel catalysts are prepared by chelating ions of a Group VIII noble metal, e.g., platinum, with a polyphosphoric acid and depositing the chelate on a porous support. The catalyst is especially useful for isomerizing hydrocarbons.

RELATED APPLICATIONS

This application is a continuation-in-part of Ser. No. 877,435, filed Nov. 17, 1969, and now abandoned.

BACKGROUND OF THE INVENTION

This invention relates to novel high surface area acidic solid catalysts and methods for their preparation and use. More particularly, it relates to catalysts for the isomerization of isomerizable hydrocarbons having 4 to 7 carbon atoms per molecule.

It is well known to use high surface area catalysts in numerous catalytic processes, especially petroleum processing operations. For example, high surface area catalysts are commonly used for cracking, hydrocracking, reforming, and hydrogenation of petroleum hydrocarbons.

In petroleum refining operations for the production of gasoline, it is often desirable to increase the octane number of the gasoline. To achieve this end it has heretofore been known to process feedstocks consisting predominantly of the lower molecular weight, normally liquid, aliphatic and alicyclic hydrocarbons containing 4 to 7 carbon atoms per molecule. Such substantial quantities of these feedstocks are available as to warrant separate processing. Although the octane can be improved by treating these feedstocks in a dehydrogenation process to produce olefins, it is preferable to convert the n-paraffins in such feedstocks to iso-paraffins, the latter being more effective in improving the octane number and reducing air pollution.

A number of catalytic isomerization processes have been used in the past. For example, Friedel-Crafts catalysts have been used; however, these types of catalysts present handling problems due to their corrosiveness. To overcome this difficulty, solid catalysts have been more generally employed. Such solid catalysts commonly contain a noble metal of the platinum series deposited on a refractory oxide support.

A typical method of preparing isomerization catalysts involves impregnating a suitable porous carrier such as alumina with a metallic compound and then decomposing the latter to form oxides of the compound. This is generally followed by activation of the catalysts, e.g., by high temperature reduction of the oxides with hydrogen to form discrete metal sites on the porous support. In such catalysts, it has been considered desirable, if not essential, to use a porous support consisting of a material having acidic surfaces, i.e., a Lewis acid.

These prior art catalysts have not been entirely without defects. One major difficulty in the preparation of such catalysts has been their lack of uniformity, especially the lack of uniformity in the position of the metallic sites relative to the acidic sites in the support. According to theory, an isomerization catalyst for paraffins preferably involves catalytic sites capable of promoting dual functions, i.e., dehydrogenation-hydrogenation (metal sites) and rearrangement (acid sites), such that the isomerizable n-paraffin is converted to an iso-paraffin by a sequence of steps thought to involve the formation of unsaturates under transient conditions on the dehydrogenation sites followed by rearrangement of the molecule on the acid sites and finally by rehydrogenation to form the saturated isomer. Thus, it has been considered desirable to have a uniform arrangement and distance between metal sites and acid sites to achieve uniform and predictable results.

Another problem with prior art catalysts has been that metal sites, which may be metal atoms, tend to coalesce due to their mobility at the high temperatures at which they are used. The consequence of such coalescence is that the catalyst is depleted in active metal surfaces. This problem has been partially overcome in some cases by adding the metal as a compound, e.g., a halide, oxide, etc. However, the hydrogenation-dehydrogenation activity of such compounds is known to be much lower than for the metals per se, and thus it is preferable to employ metals in metallic form as catalysts.

Accordingly, it is an objective of the present invention to prepare new catalysts having a uniform arrangement in their molecular distribution. It is another objective to prepare isomerization catalysts having a uniform arrangement and distance between the metallic and acid sites. Still another objective of the invention is to prepare isomerization catalysts in which metal sites are rendered relatively immobile and metal-containing compounds are effectively modified to increase their activity in the catalyst to an activity similar to that of corresponding pure metallic sites.

These and other objectives are achieved in accordance with the present invention.

SUMMARY OF THE INVENTION

This invention contemplates a catalyst which is prepared by impregnating polyphosphoric acid-chelated Group VIII noble metal onto a porous support.

In another embodiment the invention contemplates a method of preparation of a catalyst involving impregnating a porous support with polyphosphoric acid-chelated Group VIII noble metals.

In still another embodiment the invention involves reacting hydrocarbons, especially isomerizing feedstocks rich in $C_4$–$C_6$ n-paraffins by contacting them with said catalyst at reactive temperatures.

Although the chelates of this invention can be formed in situ on the porous supports, some of the common supports may be adversely affected by contact with the chelating agents, and it is therefore preferable in such cases to pre-form the chelate and then physically impregnate the support with the chelate.

The Group VIII noble metal ions which may be chelated and utilized in accordance with the present invention include platinum, palladium, rhodium, ruthenium, osmium and iridium, or any combination thereof. Platinum and palladium are preferred, especially platinum, or mixtures of platinum and palladium.

The polyphosphoric acid chelates of the invention are formed by chelating the Group VIII noble metal ions with polyphosphoric acids. Generally, pyrophosphoric, triphosphoric and tetraphosphoric acids, or mixtures thereof, are used. Higher acids tend to have too high melting points or are too viscous for convenient handling and impregnation on the porous supports. The chelates may be formed essentially instantaneously by mixing soluble compounds containing the Group VIII noble metal ions directly with polyphosphoric acids. Alternatively, the chelates can be formed by heating the metal ion-containing compounds with orthophosphoric acid at temperatures ranging generally from about 430° F. to about 600° F., preferably from about 460° F. to about 500° F. for about 5 minutes to about 24 hours, preferably from about 5 to about 60 minutes, until sufficient water has evaporated to form polymeric acids with resultant chelate formation. Thus, for example, the chelate of pyrophosphoric acid is formed in accordance with the following reaction wherein $M^+$ represents the hydrogenation-active metal ion.

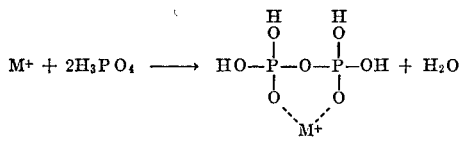

Higher temperatures tend to drive off too much water. This results in the formation of higher molecular weight polyphosphoric acids which may be solid and thus lack significant utility in this invention. Lower temperatures are ineffective since they are essentially too low to form any substantial quantities of chelate.

It is preferable to preheat the orthophosphoric acid to near the reaction temperature prior to adding the metal ion-containing compounds since this minimizes the formation of metal phosphates which would otherwise form at lower temperatures. Phosphates are generally insoluble and are of little or no value as catalytic agents for impregnating porous supports.

The ions of the Group VIII noble metals may be introduced to the orthophosphoric or polyphosphoric acids in the form of any desired compound or compounds. It is generally preferable to add the metal ions as soluble ammino complexes, halides, hydroxides, or nitrates, e.g., chloroplatinic acid, tetraamineplatinum II hydroxide, and the like. Other metal sources such as metal oxides, phosphates and the like may also be used, but formation of the chelates will be substantially retarded or inhibited, due to the formation of insolubles. The atomic ratio of phosphorus to Group VIII noble metal ions should range from about 1:1 to about 8:1 and preferably from about 1.5:1 to about 2.5:1. For example, in fully chelated pyrophosphoric acid compositions, the phosphorus to metal ion atomic ratio should be about 2:1.

Although at high temperatures very high porosity supports can be impregnated to a certain extent with the polyphosphoric acid chelates in acid form, generally such acid forms are too viscous. Therefore, in such cases it is preferable to form lower viscosity, heat-decomposable salts of the chelates and impregnate the salts onto the support and then convert them back to acid form. For example, the acid chelate may be partially or completely neutralized with ammonia to form a less viscous solution.

Although any conventional porous support can be used, a particularly important aspect of this invention involves the use of silica gel as a support. Heretofore, silica gel was considered of no utility in the preparation of isomerization catalysts since it has no acid surfaces, i.e., no Lewis acidity. However, in the present invention, silica gel is actually the preferred support, giving catalysts of exceedingly high isomerization activity. In the present invention the support is not required to be acidic since both metal and acid sites are supplied by the chelate, the chelated metal acting as a metallic site.

Other acceptable porous supports include, for example, various foraminous materials such as terrana, kaolin, magnesium silicate, magnesium carbonate, magnesium oxide, aluminum oxide, activated alumina, bauxite, silica-alumina, activated carbon, zirconia, kieselguhr, pumice, and the various natural and synthetic clays, zeolites, and the like. In any event, it is generally preferable to use those porous supports having surface areas of at least about 25 square meters per gram (m.²/g.) and pore volumes ranging above about 0.2 milliliter per gram (ml./g.). Sufficient chelate is added to provide preferably about 0.1 to about 2 weight-percent of Group VIII noble metal on the support. Although various forms of supports can be used, e.g., fine particles for fluidized solids processes, it is generally desirable to employ the catalyst of this invention in pelletized or extruded forms. These are particularly suitable for fixed catalyst bed type operations. Especially preferred are pellets ranging from about 1/32" to about 1/2" in their greatest dimension.

The unique catalysts of this invention can be used in various processes including re-forming, hydrogenation, and dehydrogenation reactions. However, they are especially useful as isomerization catalysts for the reaction of isomerizable hydrocarbons having 4 to 7 carbon atoms. It is especially surprising that in using the catalysts of this invention, exceedingly high activities are obtained in the reaction of n-butane to form isobutane, which reaction is particularly difficult and inefficient with most catalysts. The catalysts are also very useful for isomerizing n-pentane and n-hexane, or mixtures thereof.

The preferred isomerization reaction is carried out in accordance with the present invention by passing feedstocks rich in $C_4$–$C_6$ n-paraffins through a fixed bed of catalyst at temperatures ranging from about 200° F. to about 500° F. and preferably from about 300° F. to about 400° F. for mean contact times sufficient to effect significant isomerization. Preferably, in a fixed bed operation, the contact times will be optimum when feed rates are adjusted to provide feed-to-catalyst ratios ranging from about 0.1 to 4 and preferably about 0.1 to 1 volume of liquid feed per volume of catalyst per hour (v./v./hr.). The isomerization may be carried out in the presence or absence of hydrogen. If hydrogen is not utilized, the contacting is preferably carried out at about atmospheric pressure. However, to increase catalyst life, hydrogen is preferably utilized in amounts of about 200–5,000 s.c.f. per barrel of feed, and at pressures of about 200–2,000 p.s.i.g.

The invention will be better understood by reference to the following examples.

DETAILED DESCRIPTION AND EXAMPLES OF THE INVENTION

The following examples illustrate the preparation and the use of the unique catalysts of this invention:

Example I

One hundred milliliters of orthophosphoric acid (85% concentration) was added to 25 milliliters of chloroplatinic acid ($H_2PtCl_4$) solution containing 0.55 gram of platinum per 100 milliliters of solution, and the mixture was heated to 480° F. for 18 hours. During the heating the following reaction occurred:

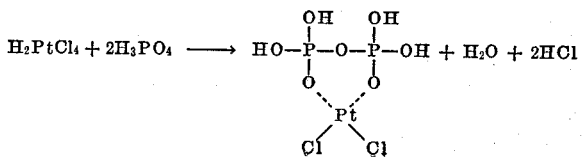

The resulting chelate product was a viscous, syrupy solution, and due to its high viscosity, it was difficult to impregnate in its acid form into a porous catalytic support. Accordingly, the chelate was cooled to 32° F. and neutralized incrementally over a period of about 5 hours with concentrated ammonium hydroxide. The slow neutralization was carried out at relatively low temperatures to avoid hydrolysis of the pyrophosphate during the process of the neutralization. In general, temperatures below ambient temperatures, i.e., below about 80° F., are desired to avoid substantial hydrolysis of the chelate back to orthophosphoric acid. Preferably, temperatures between about 32° F. and about 50° F. are used. Too low temperatures may of course be undesirable, especially with higher polyphosphoric acids, since the materials may become exceedingly viscous or solidify at low temperatures. The neutralization is carried out until a pH above about 7 is achieved; preferably sufficient base is added to obtain pH's ranging from about 8 to 11.

Fifty milliliters of the ammonium pyrophosphate chelate solution was added to 75 milliliters of a silica gel support having a surface area of about 400 m.$^2$/g. and a pore volume of about 0.5 ml./g. (available commercially from W. R. Grace Chemical Co. as Davison No. 70). The silica gel impregnated with the solution was then dried overnight at about 240° F. A 20 gm. portion of the dried material was then inserted into a silica glass atmospheric pressure reactor and heated for one hour at 700° F. in flowing argon. At these temperatures the ammonium phosphate chelate decomposed with the liberation of ammonia, thus re-forming the acid form on the silica gel support. Then the resulting product was heated to about 900° F. for one hour in flowing hydrogen to reduce the platinum to the active metallic state. The final catalyst contained about 0.2 weight-percent Pt.

Example II

The catalyst prepared in Example I was cooled to 300° F. and subjected to a flow of normal butane at the rate of 0.15 standard cubic foot per hour (1 v./v./hr.), and at atmospheric pressure. The initial effluent contained about 45% isobutane indicating that the metal pyrophosphate chelate was a highly active isomerization catalyst for normal butane, one of the most difficult materials to isomerize.

A similar preparation of catalysts on a gamma alumina support also showed isomerization activity although it was much lower than for the same platinum chelate on silica gel support.

Example III

It is also contemplated to use the metal polyphosphoric acid chelates in a supported liquid phase system. In such a system, a typical process could be operated as follows:

Tetraamineplatinum II pyrophosphate chelate is prepared following the same procedure as described in Example I but substituting tetraamineplatinum II hydroxide for the chloroplatinic acid. To prepare a support, extruded porous rods of graphite are crushed and screened to obtain a fraction ranging principally between about 0.1″ and about 0.2″ in maximum dimension. The graphite fraction is evacuated and partially saturated with the pyrophosphate chelate and heated at 700° F. in flowing argon for one hour to produce a catalyst containing about 0.1 to about 2 weight-percent platinum on the graphite. Upon heating, ammonia is liberated, leaving behind metallic platinum chelated by the pyrophosphoric acid in liquid form. Thus, it is considered generally unnecessary to carry out any hydrogen activation step to prepare the catalyst for use, the platinum being already in the metallic state. Moreover, an improved catalyst is believed to be obtained in the supported liquid system since the liquid chelate, carrying both metallic and acid sites, is in a much more mobile form than are conventional supported solid catalysts.

The precise reason for the effectiveness of the catalyst of this invention in isomerization processes is not wholly understood; however, it is believed to result from the close proximity between the chelated metal site and the acid sites on the phosphoric acid chelates. Other explanations however, may be possible. For example, it has been considered possible that the chelates of this invention are actually broken down, e.g., when the neutralized chelate is heated to convert it back to acid form, so that metal or metal compounds are actually deposited separately from the polyphosphoric acids within the support system. In any event, it is clear that the final catalyst product which results is a highly effective catalyst for the isomerization of isomerizable hydrocarbons having 4 to 7 carbon atoms as well as having many other advantages which are readily apparent from the foregoing.

I claim:

1. A catalyst composition prepared by compositing a porous carrier with a chelate of (1) at least one Group VIII noble metal, and (2) a polyphosphoric acid and/or a heat-decomposable salt thereof, the final catalyst containing about 0.1–2 weight-percent of Group VIII noble metal and active polyphosphoric acid groups.

2. A catalyst as defined in claim 1 wherein said Group VIII noble metal is platinum and/or palladium, and wherein the atomic ratio of phosphorus to Group VIII noble metal in the final catalyst is between about 1 and 8.

3. A catalyst as defined in claim 1 wherein said carrier is silica gel.

4. A catalyst as defined in claim 1 wherein said carrier is silica gel, said Group VIII noble metal is platinum, and wherein the atomic ratio of phosphorus to platinum in the final catalyst is between about 1 and 8.

5. A method for isomerizing an isomerizable hydrocarbon feedstock which comprises contacting said feedstock at temperatures between about 200° and 500° F. with a catalyst composition prepared by compositing a porous carrier with a chelate of (1) at least one Group VIII noble metal, and (2) a polyphosphoric acid and/or a heat-decomposable salt thereof, the final catalyst containing about 0.1–2 weight-percent of Group VIII noble metal and active polyphosphoric acid groups.

6. A method as defined in claim 5 wherein said feedstock is selected from the class consisting of $C_4$–$C_6$ normal paraffins.

7. A method as defined in claim 5 wherein said feedstock is n-butane.

8. A method as defined in claim 5 wherein said Group VIII noble metal is platinum and/or palladium, and wherein the atomic ratio of phosphorus to Group VIII noble metal in the final catalyst is between about 1 and 8.

9. A method as defined in claim 5 wherein said carrier is silica gel.

10. A method as defined in claim 5 wherein said carrier is silica gel, said Group VIII noble metal is platinum, and wherein the atomic ratio of phosphorus to platinum in the final catalyst is between about 1 and 8.

11. A method as defined in claim 5 wherein said feedstock is selected from the class consisting of $C_4$–$C_6$ normal paraffins, and wherein said carrier is silica gel, said Group VIII noble metal is platinum, and wherein the atomic ratio of phosphorus to platinum in the final catalyst is between about 1 and 8.

12. A method for preparing an isomerization catalyst which comprises:
(1) contacting a polyphosphoric acid with a chelatable compound of a Group VIII noble metal to form a polyphosphoric acid chelate thereof;
(2) partially or completely neutralizing the resulting chelate with ammonia to reduce the viscosity thereof;
(3) impregnating a porous carrier with the resulting ammoniated chelate; and (4) heating the impregnated carrier to decompose ammonium salts.

References Cited

UNITED STATES PATENTS

| | | | |
|---|---|---|---|
| 2,496,621 | 2/1950 | Deery | 252—435 |
| 2,547,380 | 4/1951 | Fleck | 260—683.65 |
| 2,575,457 | 11/1951 | Mavity | 260—683.65 |
| 2,584,102 | 2/1952 | Mavity | 260—683.65 |
| 2,608,534 | 8/1952 | Fleck | 260—683.65 |
| 2,890,167 | 6/1959 | Haensel | 252—435 |
| 2,935,544 | 5/1960 | Miller et al. | 260—683.65 |
| 3,122,494 | 2/1964 | Brown et al. | 260—683.65 |
| 3,609,099 | 9/1971 | Mickelson | 252—435 |

DELBERT E. GANTZ, Primary Examiner

G. J. CRASANAKIS, Assistant Examiner

U.S. Cl. X.R.

252—435, 437